| United States Patent Office | 3,752,856 |
|---|---|
| | Patented Aug. 14, 1973 |

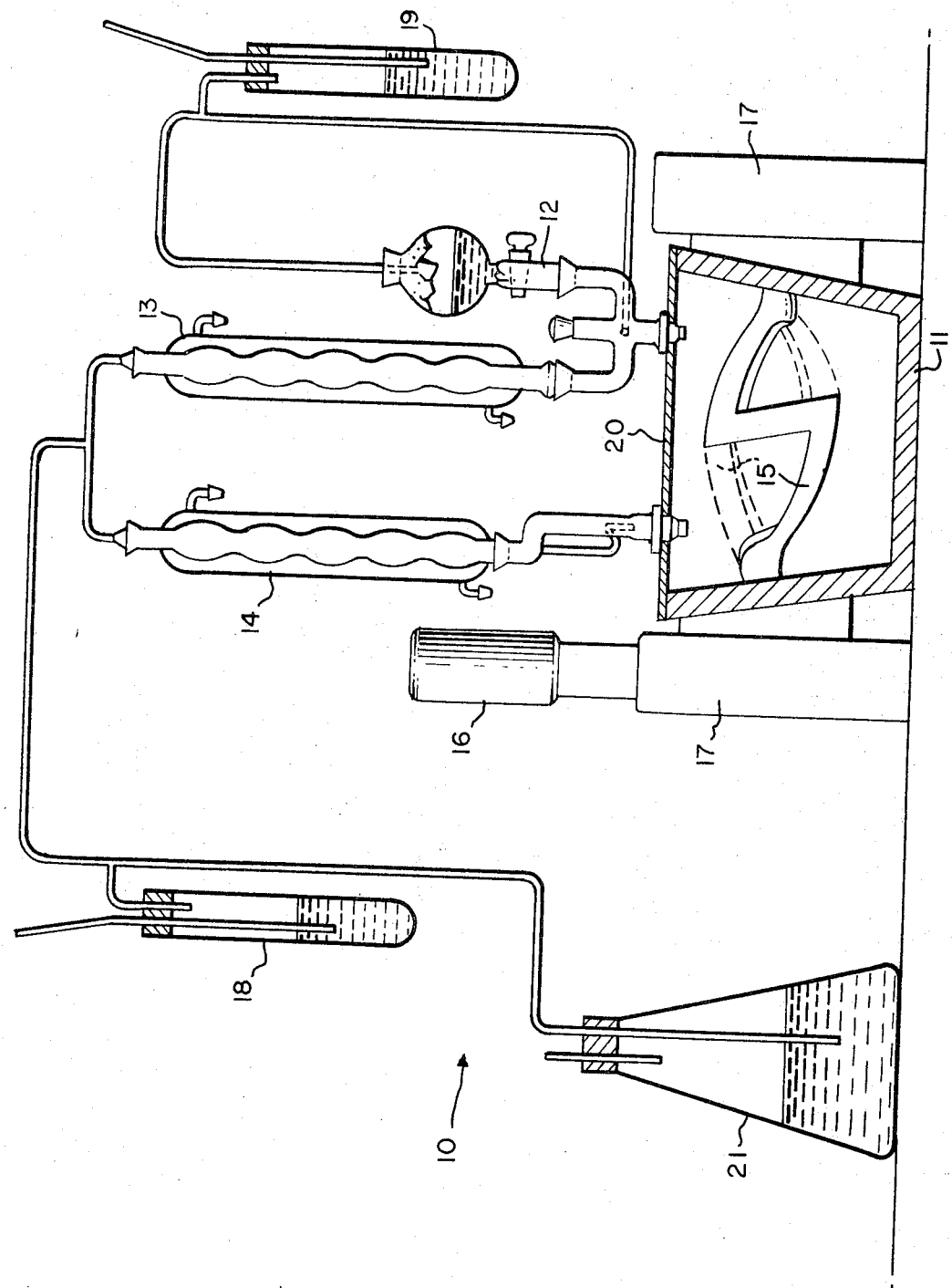

3,752,856
PROCESS FOR THE PRODUCTION OF BROMINATED AROMATIC COMPOUNDS
Georges F. Nagy, Montrouge, Daniel Balde, Levallois-Perret, and Pierre Deloy, Colombes, France, assignors to Ugine Kuhlmann, Paris, France
Filed Feb. 2, 1970, Ser. No. 7,662
Claims priority, application France, Feb. 3, 1969, 6902243
Int. Cl. C07c 41/00
U.S. Cl. 260—612 R   5 Claims

ABSTRACT OF THE DISCLOSURE

The present invention relates to a process for the production of aromatic compounds brominated on the ring portion or nucleus thereof and more specifically to the production of such compounds having a high melting point, comprising forming a solventless reaction mixture of elemental bromine and an aromatic compound and maintaining the reaction mixture during the period of reaction under constant agitation at a force sufficient to intimately mix the reactants and to crush solid brominated compounds formed by the reaction.

BACKGROUND OF THE INVENTION

The substitution of an atom of bromine for an atom of hydrogen linked to the nucleus of a non-activated aromatic compound, by means of elementary bromine, requires the application of a halogenation catalyst. Although it is possible to perform the bromination in the absence of solvent in the case of bromine compounds liquid at the reaction temperature, it is necessary to operate in the presence of an appropriate solvent or diluent, to obtain bromine compounds having a high melting point. As a general rule chlorinated or brominated paraffinic hydrocarbons such as carbon tetrachloride, chloroform, methylene chloride, tetrachloroethane, dibromomethane and dibromopropane, are employed for this purpose. All these solvents have the double disadvantage of possessing a low dissolution capacity in respect of the halogenation catalyst of the metal halide type, and of giving rise to side reactions of transhalogenation or of overbromination.

Apart from reducing the yield in respect of bromine, these two side reactions cause the formation of heavier chlorobromo or bromo compounds, which are frequently toxic and ill-smelling and which cannot be separated without difficulty from the brominated aromatic product. Moreover, the production of aromatic products wholly brominated on the aromatic nucleus cannot be performed in these solvents except in a very dilute medium, owing to their low solubility. To produce these compounds, the prior art depend on oleum as a solvent.

SUMMARY OF THE INVENTION

Applicants have discovered that it is possible to produce the aromatic compounds brominated on the nucleus, even those having a high melting point, in a heterogeneous solid-liquid medium, in the absence of solvent, by performing the bromination in apparatus equipped with a mixing device sufficiently powerful to ensure effective stirring and crushing of the totality of the reactive mixture throughout the period of production. In the instant process intimate contact is maintained constantly between the bromine and the intermediate bromination derivatives of the aromatic product. When the final brominated product is a solid at the temperature of bromination, an extremely viscous pasty intermediate phase is first formed and then becomes a crystalline mass as the reaction proceeds, and the mass is finely crushed at the very instant of its formation. The bromination is performed at moderate temperatures, between 0° and 150° C., and preferably between 20° and 80° C.

BRIEF DESCRIPTION OF THE DRAWING

The drawing is a schematic view of apparatus for carrying out the process of the instant invention.

DETAILED DESCRIPTION

In the process of the invention, the operation is preferably performed in an apparatus suitable for mixing and crushing which is impervious to corrosion by bromine and hydrobromic acid in an anhydrous medium. The apparatus comprises a blender having two or more rotary horizontal blades revolving in opposite directions and a jacket for heating and cooling a reflux condenser in communication with the blender for the purpose of condensing the bromine entrained by the flow of hydrobromic acid. The apparatus also includes means for feeding in the bromine to the blender and means for measuring the pressure and temperature.

Referring to the drawing, there is shown apparatus 10 for carrying out the instant invention comprising a blender 11, preferably a sigma blender, mounted on supports 17, and equipped with funnel 12 and reflux condensers 13 and 14 communicating with the blender through the removable top cover thereof 20. The blender 11 has two Z-shaped mixing blades 15 which are driven by motor 16. Pressure gauges 18 and 19 communicate with condensers 13 and 14 and funnel 12, respectively, and hydrobromic acid absorber 21 is in fluid-flow communication with the condensers 13 and 14. Motor 16 acts to drive the blades 15 at rates that can range from about 10 to 70 r.p.m. dependent upon reactants and conditions. The blender is equipped with a jacket (not shown) and a temperature sensor (not shown) to monitor the temperature of the reaction. To minimize corrosion the blender and blades are preferably made of stainless steel. The apparatus is structured to operate under a vacuum of 20 mms.

By way of non-limiting examples it is possible to produce the following bromo derivatives by the technique of the invention: aromatic hydrocarbons comprising one or more rings, condensed or uncondensed, such as benzene, toluene, ethylbenzene, p-xylene, polyphenylbenzenes such as diphenyl, terphenyl and alkylterphenyls, naphthalene, polystyrene; the bromo derivatives of derivatives halogenated on the ring or on the aliphatic chain of the same hydrocarbons, such as chlorobenzene, orthodichlorobenzene, p-dichlorobenzene, 1,2,4-trichlorobenzene, the mixture of isomers of trichlorobenzene, resulting from the dehydrochlorination of the so-called inactive hexachlorocyclohexanes obtained after separation of the isomer λ, tetrachlorobenzenes, partially chlorinated diphenyls, fluorobenzenes, trichloromethylbenzene, trifluoromethylbenzene; the bromo-derivatives of aromatic ethers such as anisole, phenetole, diphenyl oxide, polyphenylene oxides; and the bromo derivatives of phenols, such as phenol, p-cresol, xylenols, orthophenylphenol, naphthols, 4,4'-dihydroxydiphenyl, and partially halogenated phenols like 2,4,6-trichlorophenol.

In the case of non-activated aromatic rings, use is made of conventional halogenation catalysts, such as iodine, aluminum chloride, aluminum bromide, ferric chloride, ferric bromide, and the like or a combination of iodine and metal halides.

In carrying out the invention, the liquid or solid aromatic product it is washed to brominate, and the catalyst, are placed into the blender 10 and the blender 10 is then placed in operation while heating to the required temperature. The bromine is then fed progressively into the blender through the funnel in such manner as to have a regular evolution of hydrobromic acid. After having fed it the required quantity of bromine, in stoichiometric amount or in a small excess, and when it is wished to obtain a product wholly halogenated on the ring, grinding, or intimate mixing, is performed until the evolution of hydrobromic acid stops. The apparatus is then flushed by means of a flow of dry air, preferably under lowered pressure, to remove the residual hydrobromic acid and, if applicable, the excess of bromine, and the whole mass is allowed to cool while continuing the grinding operation. The brominated aromatic product is removed in the form of powder as a rule.

In a modified form of the technique of the invention, a flow of gaseous ammonia is fed into the apparatus after flushing with air, to neutralize the hydrobromic acid and possibly the bromine retained by the product. The hydrobromic acid and the bromine are converted into ammonium bromide, the iron or aluminum halide into an aminated complex. The apparatus may then be emptied in damp air, without incurring the risk of corrosion of the metal parts.

The brominated aromatic product obtained contains the catalyst employed which is partially or wholly transhalogenated if a metal chloride has been employed. In the modified form employing gaseous ammonia, the neutralized reaction product contains the metallic catalyst in the form of an addition compound with ammonia, as well as ammonium bromide, and it may be employed as it is for particular purposes.

The crude product may be purified by washing with acidified water or better still, by wet grinding in the presence of a dilute inorganic acid, followed by washing with water and by drying. Recrystallization in an appropriate solvent offers another possibility of purification. In the case of the products like decabromodiphenyl which retain an appreciable quantity of free bromine which cannot be eliminated completely by the customary techniques, it may be advantageous to perform the dissolution in the hot solvent with simultaneous injection of a light olefin such as ethylene or propylene; these olefins combine with bromine with formation of a dibromoalkane, which is recovered.

The halogenated compounds produced according to the process of the invention are intermediate products of interest to the industry: they may equally be employed, alone or mixed with other products, as fireproofing agents for synthetic resins like polyolefins, polyesters and polyurethanes.

EXAMPLE I 737 g. of anhydrous toluene (8 mols) and 20 g. of anhydrous aluminum chloride are loaded into the blender previously described. The apparatus is started and the infeed is begun of the anhydrous bromine through the funnel means at a rate of flow of 1 kg./hr. The reaction begins immediately and the bromine is used up in step with its injection. The reactive mixture is kept at a temperature of 20–25° C. by causing a flow of cold water in the jacket. 6 kgs. of bromine has been fed in at the end of 6 hours; the flow of addition of bromine is then reduced to 500 g./hr. and the temperature is raised progressively by a flow of hot water in the jacket. At the end of 1½ hours more, a total of 6750 g. (42.2 mols) of bromine has been fed in; an excess of 5.7% compared to the theoretical quantity, and the temperature then amounts to 70° C. The infeed of bromine is interrupted and the temperature is kept at 70° C. until the evolution of hydrobromic acid has stopped, which requires approximately 2 hours. A vacuum (20 mms. Hg) is then applied to the apparatus and flushing with dry air is performed to remove the residual hydrobromic acid and the excess of bromine. The apparatus is allowed to cool and normal pressure is reestablished. A flow of anhydrous gaseous ammonia is then passed through the blender at 20° C. for 1½ hours, at a rate of flow of 50 g./hr. The product, which appears in the form of a grey powder, is removed. 3970 g. is obtained of crude pentabromotoluene.

The product is washed by means of water acidified by hydrochloric acid to extract the aluminum bromide and the ammonium bromide it contains. 3850 g. of pentabromotoluene are obtained which appear in the form of a grey white powder. Melting point: 281° C.—bromine content: 82.05% (theoretical: 82.1%).

EXAMPLE II

The blender previously described is loaded with 849 g. of anhydrous p-xylene (8 mols) and 20 g. of anhydrous aluminum chloride. The apparatus is placed in operation and the infeed of anhydrous bromine at 450 g./hr. rate of delivery, is begun. The reaction starts immediately. The temperature of the reactive mixture is kept at 20–25° C. After 10 hours, the temperature is raised progressively to 40° C. After 12 hours, 5400 g. of bromine (33.7 mols) had been fed in, an excess of 5.1% compared to the theoretical quantity. The infeed of bromine is stopped and the temperature is kept at 40° C. until the evolution of hydrobromic acid has stopped, which requires approximately 4 hours. A vacuum (20 mms. Hg) is then applied to the apparatus, the temperature is raised to 70° C. and flushing is performed with dry air to remove the residual hydrobromic acid and the excess of bromine. Cooling is then allowed to occur, and normal pressure is restored. 3380 g. of crude aryl-tetrabromo p-xylene, are obtained which appear in the form of a grey powder.

The crude product is recrystallized in technical 1,2,4-trichlorobenzene 2970 g. of product are obtained. Melting point: 249° C., bromine content: 75.4% (theoretical: 75.5%).

EXAMPLE III

The blender previously described has loaded into it 617 g. of anhydrous diphenyl (4 mols) and 30 g. of anhydrous aluminum chloride. The apparatus is then placed in operation and the reactive mixture is heated to 45°. The infeed of anhydrous bromine is then begun at a rate of delivery of 700 g./hr. The reaction starts immediately. 5600 g. of bromine has been fed in by the end of 8 hours. The temperature of the reactive mixture is then raised to 70° and the rate of delivery of bromine is reduced to 500 g./hr. A total of 7100 g. of bromine (44.5 mols), or with an excess of 11% compared to the theoretical quantity, has been fed in by the end of 11 hours. The infeed of bromine is stopped and the temperature is kept at 70° C. to eliminate the residual hydrobromic acid and the surplus of bromine. The apparatus is cooled and normal pressure is restored. A flow of anhydrous gaseous ammonia is then caused to pass through the blender for an hour, at a rate of flow of 100 g./hr. 4100 g. of crude decabromodiphenyl are obtained, which appear in the form of an ocher powder, having a pungent smell.

This product is purified by means of two processes. A fraction of 2000 g. of crude product is heated at the temperature of 200° C. under normal pressure and under a nitrogen flow. 120° g. of bromine is thus collected, which had been retained by the decabromophenyl, and 1880 g. of product is obtained, containing 40 g. of ammonium and aluminum bromides. Another fraction of crude product is dissolved in 11 kgs. of boiling trichlorobenzene (210° C.). During the dissolution, 28 g. of ethylene (1 mol) is injected into the hot solution to combine with the released bromine. Filtering is performed in the hot state to retain the inorganic bromides, and crystallization by cooling is allowed to proceed. 1500 g. of crystallized decabromodiphenyl are obtained which appears in the form of needles having a light yellow color. Melting point: 370° C., bromine content: 84.5% (theoretical: 84.72%).

EXAMPLE IV

The blender previously described has loaded into it, 851 g. of anhydrous diphenyloxide (5 mols) and 20 g. of anhydrous aluminum chloride. The apparatus is placed in operation and the infeed is begun of anhydrous bromine at a rate of flow of 1400 g./hr. The reaction starts immediately. The reactive mixture is kept at a temperature of 20–25° C. After 3 hours, the rate of delivery of bromine is reduced to 700 g. hr. After 3 hours, the flow of bromine is reduced again to 500 g./hr. and the temperature is allowed to rise to 50° C. owing to the exothermicity of the reaction. By the end of 10 hours 15 minutes, a total of 8400 g. of bromine (52.5 mols) had been fed in, or with an excess of 5% compared to the theoretical quantity. The infeed of bromine is stopped, heating is applied progressively up to 65° C. and this temperature is maintained until the evolution of hydrobromic acid has stopped, which requires approximately 5 hours. A vacuum (20 mms. Hg) is then applied to the apparatus and flushing is performed with dry air to eliminate the residual hydrobromic acid and the excess of bromine. Cooling is then allowed to proceed and normal pressure is restored. A flow of anhydrous gaseous ammonia is then caused to pass through the blender at a rate of flow of 70 g./hr. 4925 g. of crude decabromodiphenylether are obtained which appear in the form of a greyish powder.

This product is purified by recrystallization in 5 kgs. of trichlorobenzene. 4200 g. of crystallized product are obtained which appear in the form of needles of grey-white color. Melting point: 294–295° C., bromine content: 83.63% (theoretical: 83.5%).

EXAMPLE V

The blender previously described has charged into it 1815 g. of anhydrous trichlorobenzene (10 mols), consisting of a mixture obtained by dehydrochlorination of the so-called inactive isomers of hexachlorocyclohexane, principally containing the isomer 1,2,4 of trichlorobenbene and 20 g. of anhydrous aluminum chloride. The apparatus is placed in operation and the reactive mixture is heated to 50° C. The infeed is then started of anhydrous bromine at a rate of flow of 3500 g./hr. The reaction begins immediately. At the end of one hour, the rate of flow of bromine is reduced to 2000 g./hr. After 1 hour 45 minutes, a total of 5000 g. of bromine (31.2) had been fed in, or say an excess of 4% compared to the theoretical quantity. The infeed of bromine is stopped, the temperature is raised progressively to 80° C. and this temperature is maintained until the evolution of hydrobromic acid stops, which requires approximately 3 hours. The total duration of the reaction thus amounted to 5 hours. A vacuum (20 mms. Hg) is then applied to the apparatus, while keeping the temperature at 80° C., to remove the residual hydrobromic acid and the excess of bromine. The apparatus is cooled and normal pressure is restored. An anhydrous gaseous flow of ammonia is then caused to pass through the blender for 1½ hours at a rate of flow of 50 g./hr. 4307 g. is obtained of crude product which appears in the form of a grey powder.

The product is washed with water acidified by means of hydrochloric acid to extract the aluminum bromide and the ammonium bromide it contains. 4150 g. of trichlorotribromobenzene are obtained which appear in the form of a powder of grey-white color. Melting point: 255–258° C., chlorine content: 25.9% (theoretical 25.44%), bromine content: 57.3% (theoretical: 57.33%). These values show that there is no tranhalogenation of the chlorinated aromatic product in the operating conditions employed.

EXAMPLE VI

The blender described previously has loaded into it, 1815 g. of a mixture of isomers of anhydrous trichlorobenzene (10 mols) and 80 g. of iron in powder form (0.43 atoms). The apparatus is placed in operation, the reactive mixture is heated to 60° C. and the infeed of anhydrous bromine is begun. The reaction is not immediate, it starts only after iron bromide has been formed. A little after the onset of the infeed of bromine, a bromine reflux is observed, which limits the rate of flow of infeed to 800 g./hr. 4000 g. of bromine had been fed in by the end of 5 hours. The quantity of bromine which had reacted, calculated according to the quantity of hydrobromic acid released, is of no more than 2400 g. The infeed of bromine is stopped and the reactive mixture is heated to 80° C. This temperature is maintained for 20 hours while noting the quantity of hydrobromic acid released. During this period, 1300 g. of bromine and 10 g. of iron in powder form, were added in small batches. Altogether, the reaction lasted 25 hours, with infeed of 90 g. of iron in powder form (1.60 atoms) and 5300 g. of bromine (33.1 mols), or an excess of 10.3% compared to the theoretical quantity. A vacuum is then applied (20 mms. Hg) and flushing is performed with dry air to eliminate the residual hydrobromic acid and the excess of bromine, which requires approximately 2 hours. Cooling is then allowed to proceed, and normal pressure is restored. 4650 g. is obtained of crude trichlorotribromobenzene, which appears in the form of an ochre-red powder.

This product is purified by washing with water acidified by means of hydrochloric acid to extract the iron bromide it contains. 4050 g. is obtained of trichlorotribromobenzene having the following characteristics: melting point: 246° C., bromine content: 52.0% (theoretical: 57.33%), product obtained is a mixture of trichlorotribromobenzene and trichlorodibromobenzene.

EXAMPLE VII

The blender described previously has loaded into it, 752 g. of anhydrous phenol (8 mols) and 20 g. of anhydrous aluminum chloride. The apparatus is placed in operation and the infeed of anhydrous bromine is started at a rate of flow of 1000 g./hr. The reaction starts immediately. The temperature of the reactive mixture rises progressively to 60° C. owing to the exothermicity of the reaction. After 5 hours, 5000 g. of bromine had been fed in. The rate of flow of bromine is then reduced to 500 g./hr. After 8½ hours, a total of 6750 g. of bromine (42.2 mols) had been fed in, or with an excess of 5.5 compared to the theoretical quantity. The infeed of bromine is stopped, heating to 70° C. is performed gradually, and this temperature is maintained until the evolution of hydrobromic acid has stopped, which requires approximately 5 hours. A vacuum (20 mms. Hg) is then applied to the apparatus while maintaining the temperature at 70° C. to expel the residual hydrobromic acid and the excess of bromine. The apparatus is then allowed to cool and normal pressure is restored. A flow of anhydrous gaseous ammonia is then passed through the blender at 20° C. for 1 hour, with a rate of flow of 80 g./hr. 3980 g. of crude pentabromophenol are obtained which appear in the form of a grey powder. The crude product is dissolved in N/1 NaOH and the solution is filtered. 3720 g. of pentabromophenol is obtained by acidifying the solution. Melting point: 225° C., bromine content: 81.69% (theoretical: 81.77%).

EXAMPLE VIII

The blender described previously has loaded into it 941 g. of anhydrous phenol (10 mols) and 72 g. of iron powder (1.3 atoms). The apparatus is placed in operation and the infeed is started of anhydrous bromine at a rate of flow of 1500 g./hr. The reaction starts immediately 4500 g. of bromine has been fed in by the end of 3 hours. The temperature of the reactive mixture rises progressively to 60° C. owing to the exothermicity of the reaction. The infeed of bromine is continued while progressively reducing the rate of flow, 4200 g. of bromine had been fed in within 8 hours and the temperature of the reactive mixture is 80° C. A total of 8700 g. of bromine (54.4 mols) had been fed in, or a surplus of 8.6% compared to the theoretical quantity. The temperature is kept at 80° C. until the evolution of hydrobromic acid stops, which requires approximately 3 hours. A vacuum (20 mms. Hg) is then applied to the apparatus to expel the residual hydrobromic acid and the excess of bromine. The apparatus is then allowed to cool and normal pressure is restored. 5240 g. of crude pentabromophenol is obtained, which appears in the form of a reddish powder.

The crude product is dissolved in N/1 NaOH, the solution is filtered, after which the pentabromophenol is reprecipitated by acidifying the solution. 4500 g. is obtained of pure pentabromophenol. Melting point: 225° C., bromine content: 81.66% (theoretical: 81.77%).

EXAMPLE IX

The blender described previously has loaded into it 770 g. of anhydrous diphenyl (5 mols) and 10 g. of anhydrous aluminum chloride. The apparatus is placed in operation and the addition of anhydrous bromine is started at ambient temperature. 2700 g. of bromine is added in the course of the first hour: the reaction is total. A second fraction of 10 g. of anhydrous aluminum chloride is then added and the addition of bromine is continued while heating progressively to 50° C. The reactive mixture becomes ever more viscous and crystallizes finally after the addition of approximately 6000 g. of bromine during 4½ hours of reaction. A third fraction of 10 g. of anhydrous aluminum chloride is then added and the addition of bromine is continued. The addition of the bromine is stopped after 6 hours (total added 9500 g.). A fourth and last fraction of 10 g. of anhydrous aluminum chloride is added, and the heating operation is continued until evolution of hydrobromic acid stops. The reaction lasts approximately 7½ to 8 hours. The excess of bromine is then eliminated under vacuum (20 mms. Hg) under a flow of dry air at 70° C. 5100 g. of crude product are thus obtained appearing in the form of an ocher powder and which, heated under a flow of air at 150° C.–200° C., loses approximately 7–8% of bromine. 4700 g. crude product are obtained which is finally washed with an aqueous NaOH solution.

After drying 4600 g. (97.5%) of decarbromodiphenyl is obtained. Melting point: 372° C., carbon content: 15.3% bromine content: 84.6%.

EXAMPLE X

The blender described previously has loaded into it 2527 g. (7 mols) of hexachlorodiphenyl and 20 g. of anhydrous aluminum chloride. The apparatus is placed in operation and heating is performed to 60–70° C., after which the addition of bromine is started. The reaction is very fast; approximately 1120 g. of bromine is added within 30 minutes. After one hour, a second fraction is added of anhydrous aluminum chloride, the reaction slows down a little. By the end of 2 hours, a total of 2300 g. of bromine had been added and the reaction becomes much slower. At the end of 4½ hours, when a total of 3000 g. of bromine had been added, the reactive mixture crystallizes suddenly and the reaction speeds up very markedly. At the end of 5½ hours, a third and last fraction of 10 g. of anhydrous aluminum chloride is added. The addition of bromine is stopped after 6½ hours. A total of 5900 g. of bromine had been added by then. The evolution of hydrobromic acid stops and the reaction ends after 7 hours. The excess of bromine is eliminated by heating (1½ hours) under 20 mms. Hg at 80° C. under a flow of air. After return to ambient pressure and temperature, 4800 g. of crude product are obtained which, after washing with NaOH, yields 4600 g. of hexachlorotetrabromodiphenyl (98%). Melting point: 292° C. (after recrystallization: 316° C.), carbon content: 21.58%, chlorine content: 31.2%, bromine content: 47.5%.

EXAMPLE XI

The blender described previously has loaded into it 2527 g. (7 mols) of hexachlorodiphenyl and 20 g. of anhydrous aluminum chloride. Heating is performed to 60–70° C. and the apparatus is placed in operation, after which the addition of the bromine is started. The operation is conducted precisely as in Example X, but the addition of bromine is stopped after having added 3930 g. of bromine in 5 hours. 1700 g. of hydrobromic acid was eliminated and 600 g. of bromine was entrained during this period. The surplus of bromine remaining in the reactive mixture is eliminated as before and 4200 g. of a crude product are obtained which, after washing, yield 4100 g. of hexachlorotribromodiphenyl (97%). Melting point: 226° C., chlorine content: 35.3%, bromine content: 40%.

EXAMPLE XII

The operation is conducted as in Example IX, starting with 770 g. (5 mols) of diphenyl. The reaction is stopped after 7 hours after having added 8300 g. of bromine. 3670 g. of hydrobromic has been released during this period, which had entrained 800 g. of bromine. After having eliminated the excess of bromine and the residual hydrobromic acid, 4510 g. of crude product are obtained which, after washing, yielded 4300 g. of nonabromodiphenyl (99%). Melting point: 340° C., bromine content: 83%.

EXAMPLE XIII

The blender described previously has loaded into it 1500 g. of polystyrene in beads of a smaller diameter than 1 mm. (Lorkalene T 7) and 10 g. of iodine acting as a catalyst. The apparatus is placed in operation and 374 g. of bromine (2.34 mols) is added progressively in 3 hours. During this time, the reactive mixture is heated progressively by causing a flow of hot water to pass through the jacket of the tank (80° C.). 1.7 mols of hydorbromic acid is collected. The surplus of bromine is eliminated under vacuum (20 mms. Hg) under a flow of dry air at 70° C. and 1690 g. of crude product are obtained appearing in the form of spheroids, or agglomerates of spheroids, which are shiny and violet-colored. This product is dissolved in hot toluene and reprecipitated by pouring the previously filtered toluenic solution into an excessive quantity of methanol. Brominated polystyrene is obtained, containing 8.4% of bromine. This product, submitted to the A.S.T.M. D 635 test is assessed as being self-extinguishing.

What is claimed is:

1. A process for the bromination of aromatic compounds on the ring portion thereof by means of elemental bromine comprising reacting an aromatic compound in the absence of solvent with an amount of bromine sufficient to form brominated aromatic products which are solid under the conditions of the bromination reaction and maintaining the reaction mixture during the period of reaction under constant agitation at a force sufficient to intimately admix the reactants and to crush the solid brominated aromatic products as they are formed wherein a finely crushed solid mixture product is formed and the brominated product is recovered therefrom.

2. The process of claim 1 wherein the reaction is carried out at a temperature between about 0° C. to 150° C.

3. The process of claim 2 wherein the bromine is incrementally added to the reaction mixture until about a stoichiometric amount thereof, in proportion to the aromatic compound, has been added to the reaction mixture.

4. The process of claim 3 wherein the reaction is continued until any substantial evolution of hydrobromic acid ceases.

5. The process of claim 4 wherein the reaction mixture includes a halogenation catalyst.

References Cited

UNITED STATES PATENTS

| | | | |
|---|---|---|---|
| 3,062,899 | 11/1962 | Sax | 260—650 R |
| 3,192,272 | 6/1965 | Asadorian | 260—650 R |
| 2,452,154 | 10/1948 | Ross | 260—650 R X |
| 2,778,857 | 1/1957 | Benman et al. | 260—650 RX |

BERNARD HELFIN, Primary Examiner

U.S. Cl. X.R.

260—650 R, 649 DP, 623 H, 612 D, 620, 630 F, 96 HA